(12) United States Patent
Kientz

(10) Patent No.: US 7,085,091 B1
(45) Date of Patent: Aug. 1, 2006

(54) REDUCING TAPE MEDIA DAMAGE IN DATA REGIONS

(75) Inventor: Steven Michael Kientz, Westminster, CO (US)

(73) Assignee: Storage Technology Corporation, Louisville, CO (US)

(*) Notice: Subject to any disclaimer, the term of this patent is extended or adjusted under 35 U.S.C. 154(b) by 247 days.

(21) Appl. No.: 10/746,383

(22) Filed: Dec. 26, 2003

(51) Int. Cl.
*G11B 15/48* (2006.01)
*G11B 5/584* (2006.01)

(52) U.S. Cl. .................................. 360/74.1; 360/77.12
(58) Field of Classification Search ............... 360/74.1, 360/77.12
See application file for complete search history.

(56) References Cited

U.S. PATENT DOCUMENTS

| | | | |
|---|---|---|---|
| 2,501,407 A | 3/1950 | Olsen et al. | |
| 2,618,465 A | 11/1952 | Austin, Jr. | |
| 3,143,270 A | 8/1964 | Cohen | |
| 3,642,229 A | 2/1972 | Downey et al. | 242/199 |
| 3,889,900 A | 6/1975 | Nelson | 242/199 |
| 4,114,751 A | 9/1978 | Nordin | 400/248 |
| 4,170,175 A | 10/1979 | Conlon, Jr. | 101/1 |
| 4,335,857 A | 6/1982 | Pfost et al. | 242/192 |
| 4,607,808 A | 8/1986 | Collins | 242/192 |
| 5,992,827 A | 11/1999 | Kvalsund | 254/398 |
| 6,116,535 A | 9/2000 | Selg et al. | 242/615.2 |
| 6,320,727 B1 | 11/2001 | Cope et al. | 360/130.21 |
| 2003/0001037 A1* | 1/2003 | Plourde et al. | 242/346.1 |
| 2004/0238671 A1* | 12/2004 | Brown et al. | 242/348 |

FOREIGN PATENT DOCUMENTS

| | | |
|---|---|---|
| JP | 59 190153 | 10/1984 |
| JP | 4 64953 | 2/1992 |
| JP | 4 135010 | 5/1992 |

* cited by examiner

*Primary Examiner*—David Hudspeth
*Assistant Examiner*—Mitchell Slavitt
(74) *Attorney, Agent, or Firm*—Yee & Associates, PC

(57) ABSTRACT

A method and apparatus for reducing tape media edge damage in data regions. The present invention controls where popped strand occur by shifting the wrap turn around/stream points in the tape media to an unused region of tape. As data is written for the length of the tape, when a wrap turn around point is reached, the write current is shut off. However, the servo motors in the tape drive continue to stream the tape for a predefined distance past the turn around point. The head may then be moved transversely to acquire a new track. The tape may then be spooled in the reverse direction on the new track. When a wrap point is encountered, the write current may be turned on and the next track (wrap) may be written. This combination of steps may be repeated for each serpentine wrap on the tape.

16 Claims, 3 Drawing Sheets

REDUCING TAPE MEDIA DAMAGE IN DATA REGIONS

BACKGROUND OF THE INVENTION

1. Field of the Invention

The present invention relates generally to mitigating tape media damage. More particularly, the present invention relates to a method and apparatus for shifting the wrap turn around/stream points in a tape media to an unused region of tape, thereby controlling where edge damage occurs.

2. Background of the Invention

Magnetic tapes, including reel and cassette-style cartridges and other devices that use magnetic media, are used in many industries to store data, programs, and other information. Magnetic tapes are typically stored on reels or spools, which are cylinders about which the tape is wound, typically having flanges to guide the tape onto the cylinder. Accessing information from a reel or spool of tape typically requires that the spool be inserted into a reading machine, which unwinds the tape from the file spool and winds it onto a temporary storage spool (also referred to as a machine reel or machine spool) until the portion of the tape with the desired information is reached. A magnetic read element reads the information, and the tape is rewound back onto the original file spool and removed from the reader.

A problem with tape media, especially with single reel media cartridges, is the propensity for edge damage to cause loss of data. Edge damage typically arises from the occurrence of a popped strand. A popped strand is a section of the wound tape not in alignment with the rest of the tape. Popped strands usually occur when the tape drive performs a start or stop operation. When the tape is started again or is stopped, the tape may experience movement in a direction perpendicular to normal tape motion as the tape is brought up to speed or when the tape is stopped. This lateral tape motion may result in a popped strand.

On a typical spool holding the magnetic tape, the spacing between the upper and lower flexible flanges of the spools (both the file spool and the machine spool) is wider than the nominal width of the tape. As the tape is fed onto these spools, lateral tape motion may occur during a start or stop operation, and a popped strand may result. The popped strand itself does not cause tape edge damage. Rather, tape edge damage may be caused when the flexible flange is forced against the popped strand during shipment or rough handling, such as if the spool is dropped. If the edge damage is severe, track following capability may be lost and the head to tape spacing may increase to the point where data cannot be read back.

As tape media construction is getting thinner, the tape will be more prone to edge damage. This tape may fail at customer sites due to edge damage near the beginning of tape (BOT). An ideal solution to lessen tape damage would be to eliminate the occurrence of popped strands. One such technique includes performing a high-speed rewind through the wrap turn around points to reduce the number of popped strands, thereby minimizing the potential for tape edge damage. However, as this technique still does not eliminate popped strands entirely, tape edge damage may still occur in data regions and tape format regions.

Thus, it would be advantageous to have a method and apparatus for controlling where popped strands occur to mitigate tape edge damage.

SUMMARY OF THE INVENTION

The present invention is a method and apparatus for reducing tape media edge damage in data regions. The present invention controls where popped strand occur by shifting the wrap turn around/stream points in the tape media to an unused region of tape, thereby controlling where tape edge damage may occur.

The mechanism of the present invention uses software to direct the tape drive processor to control where the popped strands occur. As data is written for the length of the tape, when a wrap turn around point is reached, the write current is shut off. However, the servo motors in the tape drive continue to stream the tape for a predefined distance past the turn around point. The head may then be moved transversely to acquire a new track. The tape may then be spooled in the reverse direction on the new track. When a wrap point is encountered, the write current may be turned on and the next track (wrap) may be written. This combination of steps may be repeated for each serpentine wrap on the tape.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method and system for preserving data integrity by reducing tape edge damage in the tape data regions. Tape is typically wound on one or two reels in a protective housing, such as a cassette or cartridge. A reel includes a cylindrical hub about which tape is wound to form a tape pack. Flanges are attached to either end of the hub and extend beyond the tape pack to guide and protect the tape. Tape edge damage may be caused when the flexible flange is forced against the popped strand during shipment or rough handling. The present invention assumes that popped strands may occur and that tape damage may result. However, the present invention controls where the popped strands occur, such that any resulting tape damage occurs only in unused regions of tape, thus preserving data integrity.

Figure 1:
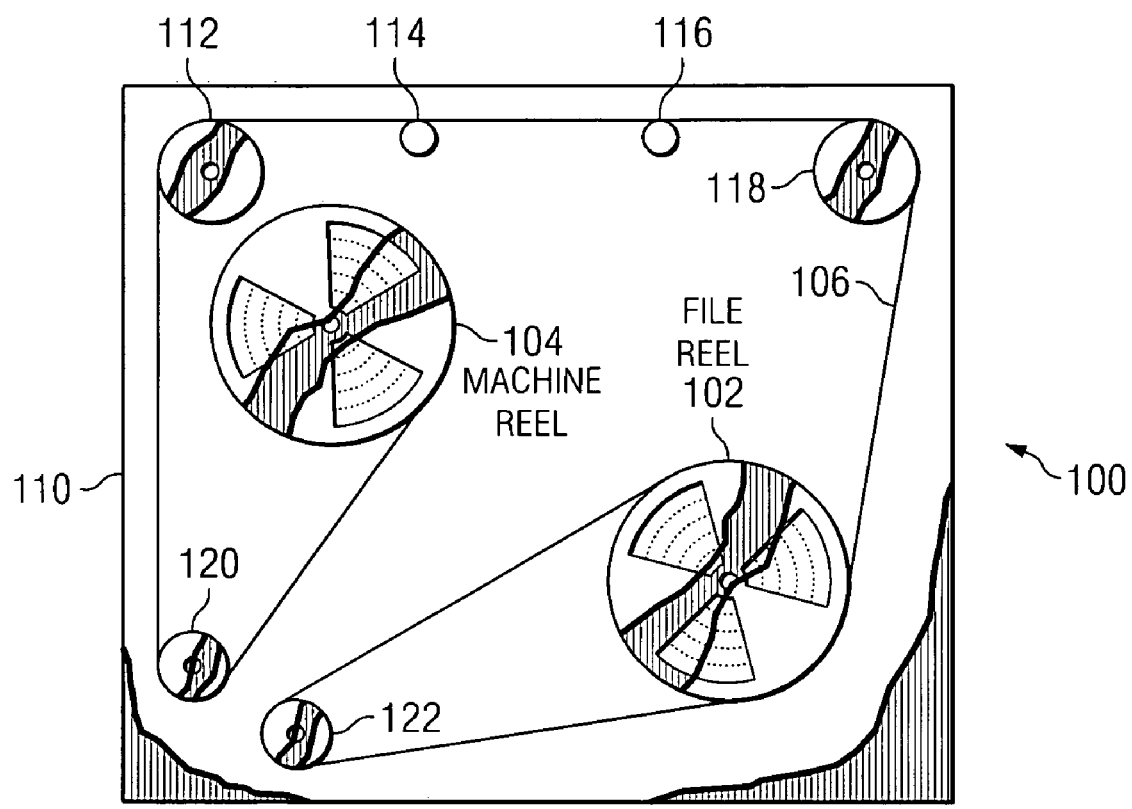
FIG. 1 is a top view of a tape cartridge in accordance with the present invention.

With reference now to FIG. 1, a top view of a tape cartridge is depicted in accordance with the present invention. Tape cartridge 100 includes file reel 102 for supplying tape to machine reel 104. File reel 102 is also referred to as a supply reel. Machine reel 104 is also referred to as a take-up reel. Tape 106 travels in a tape path between file reel 102 and machine reel 104. Alternatively, multiple read/write heads may be used for reading and writing data to tape 106.

In this example, a plurality of guide rollers 112, 114, 116, and 118 are provided for guiding tape 106 through the tape path, although any number of guide rollers may be used in the tape cartridge. The guide rollers may be flanged or unflanged, spinning or stationary, contoured or not contoured. Guide rollers 112, 114, 116, and 118 limit lateral tape motion, skew, and cross-web tension.

Post guides 120 and 122 may also be used to extend the total length of the tape path. The inclusion of post guides 120 and 122 in tape cartridge 100 permits guide rollers 112, 114, 116, and 118 to be moved as far as possible from file reel 102 and machine reel 104. Any known guides may be used to implement post guides 120 and 122. Post guides 120 and 122 may be flanged or unflanged, spinning or stationary, contoured or not contoured.

Tape cartridge 100 will typically be housed within a housing in a storage device. The housing, such as housing 110, is a finite size and a particular shape as determined by marketing requirements. The size and shape of the housing will limit the placement of the various rollers, guides, heads, and reels of the tape mechanism.

Popped strands may occur in file reel 102 and machine reel 104. A popped strand is a section of the wound tape not in alignment with the rest of the tape. Popped strands may occur when the tape drive performs a start or stop operation. When the tape is started again or is stopped, the tape may experience some lateral motion as the tape is brought up to speed or when the tape is stopped. On a typical spool holding the magnetic tape, the spacing between the upper and lower flexible flanges of the spools (both the file spool and the machine spool) is wider than the nominal width of the tape. As the tape is fed onto these spools, the tape may move in a perpendicular to normal tape motion during a start or stop operation, resulting in a popped strand. This perpendicular movement is referred to as lateral tape motion. The popped strand itself does not cause tape edge damage. Rather, tape edge damage may be caused when the flexible flange is forced against the popped strand during shipment or rough handling, since the edge of tape are standing out from the tape pack. If the edge damage is severe, track following capability may be lost and the head to tape spacing may increase to the point where data cannot be read back.

Figure 2:
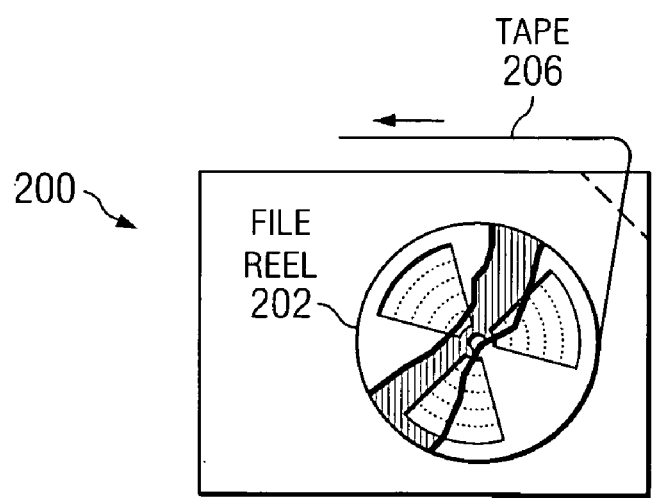
FIG. 2 is a top view of a single reel tape cartridge in accordance with the present invention.

The present invention may also be used with single reel cartridges, such as cartridge 200 as shown in FIG. 2. FIG. 2 illustrates a top view of a single reel tape cartridge in accordance with the present invention. Tape cartridge 200 includes file reel 202 for supplying tape to a take up reel (not shown) located external to cartridge 200. Popped strands may occur in file reel 202. Tape 206 travels in a tape path between file reel 202 and the take up reel.

Figure 3:
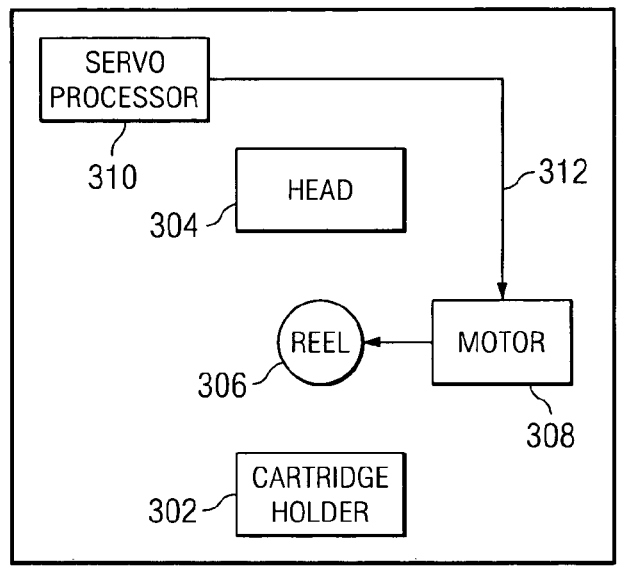
FIG. 3 is a diagram of components used to control where popped strand occur on a tape in accordance with the preferred embodiment of the present invention.

Turning now to FIG. 3, a block diagram of components used to control where popped strands occur on a tape is depicted in accordance with a preferred embodiment of the present invention. Tape drive system 300 includes a cartridge holder 302, which is designed to receive a cartridge, such as tape cartridge 100 in FIG. 1 and tape cartridge 200 in FIG. 2, for presentation to a read/write head 304. In this example, reel 306 is controlled by motor unit 308. Motor unit 308 is capable of turning reel 306, such as file reel 302 and machine reel 104 in FIG. 1, in both a clockwise and counter clockwise direction.

The speed of motor unit 308 and the direction of motor unit 308 is controlled by servo processor 310, which is in communication with motor unit 308 through line 312, which provides an electrical path to motor unit 308 to control the movement of reel 306. Motor unit 308 may include two motors in which one motor is attached to the inner reel to draw tape from a source, while a second motor is coupled to the take-up reel to wrap the tape.

Servo processor 310 includes instructions used for generating the necessary control signals to selectively control the rotation of reel 306 through motor unit 308.

The components illustrated in FIG. 3 are not meant to imply architectural limitations to a storage system in which the present invention may be used. The other components necessary for the reading and/or writing of a magnetic tape also may be included within tape drive system 300.

Figure 4:
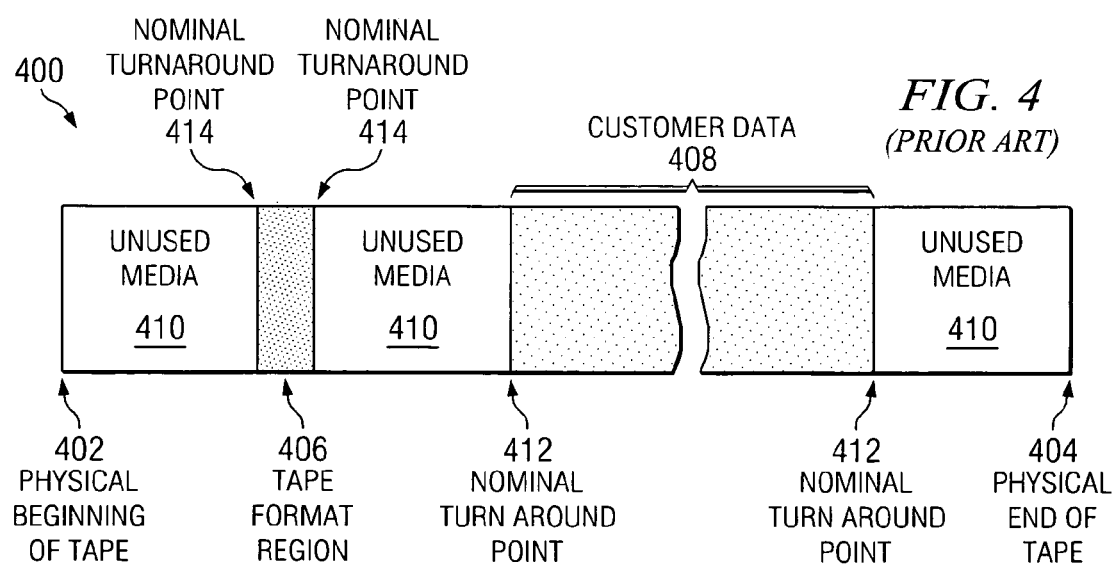
FIG. 4 is a diagram of a known tape media format.

Turning next to FIG. 4, a diagram of a known tape media format is shown, wherein the current wrap turn around/stream points used to the tape media are illustrated. Tape media 400 may be a tape such as tape 106 in FIG. 1. The entire length of tape 400 is shown from physical beginning of tape (BOT) 402 to physical end of tape (EOT) 404. Tape 400 includes tape format region 406, data region 408, and unused media regions 410. Tape 400 is wound onto a reel, such as file reel 102 in FIG. 1.

When tape 400, wound onto file reel 102 in FIG. 1, is loaded into a tape drive for the first time, tape 400 may be tested by performing a full write. At the beginning and end of data region 408, popped strands may be created at turn around/stream points 412 due to the lateral tape motion caused by the start/stop of the tape. When the tape is unloaded, tape format region 406 is updated, which may create popped strands at turn around/stream points 414. For each wrap written to tape 400, the popped strand is amplified. The total popped strand height may be as much as 2 mm.

During shipping, the flexible flange may impact the high popped strands near the outer edge of the tape pack, causing tape damage. This impact creates read/write problems at the turn around/stream points of tape 400.

As mentioned previously, the present invention controls tape edge damage by controlling where popped strands occur. To control where popped strands occur, the write current is shut off and the tape streaming motion is continued for about 1 to 2 meters past the turn around point. The present invention shifts the wrap turn around point in order to move the popped strand, which may become damaged, out of the data region to an unused region of tape. Likewise, before data is written onto the tape, the servo motors start the streaming motion when a proposed wrap point, located in an unused tape region, is reached. The write current is then turned on when a nominal wrap point within the data region is encountered. The present invention may also be used to preserve the data integrity of the tape format region.

Figure 5:
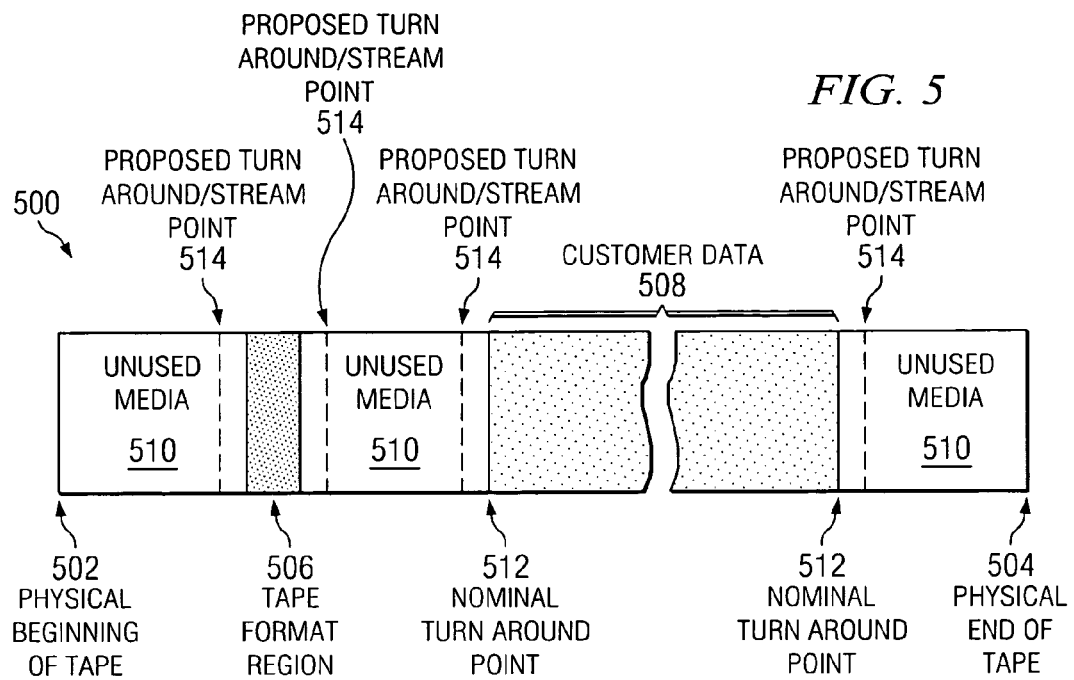
FIG. 5 is a diagram of a tape media format having proposed turn around/stream points in unused data regions of the tape media in accordance with a preferred embodiment of the present invention.

Turning now to FIG. 5, a diagram of a tape media format having proposed wrap turn around points in unused data regions of the tape media is depicted in accordance with a preferred embodiment of the present invention. Tape media 500 may be a tape such as tape 106 in FIG. 1. The entire length of tape 500 is shown from physical beginning of tape (BOT) 502 to physical end of tape (EOT) 504. Tape 500 includes tape format region 506, data region 508, and unused media regions 510.

Nominal turn around/stream points 512, such as turn around points 412 in FIG. 4, are positioned at the beginning and end of data region 508. The wrap turn around/stream points may be shifted by altering the software code controlling the tape drive. The proposed tape media format of the present invention shifts nominal turn around/stream points 512 to about 1 to 2 meters, such that turn around/stream points 514 are now located in unused media regions 510. When the tape drive performs a start or stop operation and a popped strand occurs in the tape pack, the popped strand is located in an unused media region of the tape. By altering the tape drive software code to continuing streaming past the nominal turn around points to the proposed turn around points, any edge damage may experience some lateral motion as the tape is brought up to speed or when the tape is stopped. In this manner, if tape edge damage is caused when the flexible flange is forced against the popped strand during shipment or rough handling, the tape edge damage may not interfere with track following capability since the tape edge damage is located in an unused region of the tape.

Figure 6:
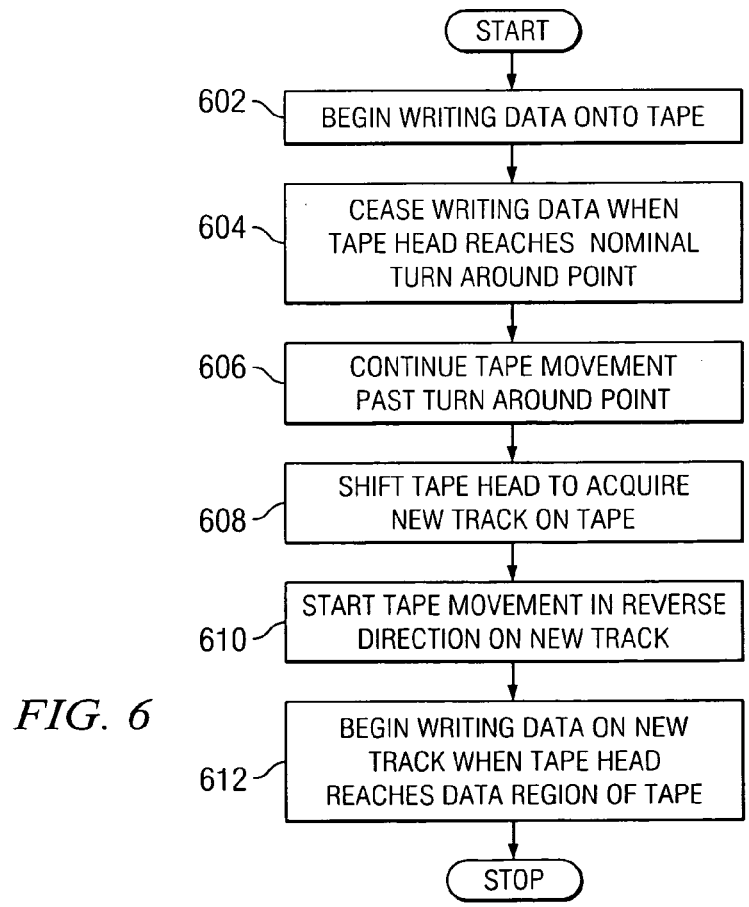
FIG. 6 is a flowchart of the process for controlling where popped strands occur in a tape in accordance with a preferred embodiment of the present invention.

Turning now to FIG. 6, a flowchart of the process for controlling where popped strands occur in a tape is depicted in accordance with a preferred embodiment of the present invention. This process allows the popped strands that occur at the turn around point from start/stop and lateral head motion to occur in a region where there is no data. The process begins by writing data for the length of the tape (step 602). When a nominal tape turn around point is reached, the data write is stopped (step 604). However, the servo motors continue to stream the tape for a predetermined distance past the nominal turn around point (step 606). Preferably, the tape is streamed for several meters past the turn around point. Next, the head is shifted transversely to acquire a new track on the tape (step 608). At the proposed turn around point, the tape is then started in a reverse direction on the new track (step 610), wherein the tape movement is started in an unused region of tape. When the nominal wrap point of the data region is encountered, data may then be written to the next track (step 612). The above combination of steps may be repeated for each serpentine wrap on the tape.

Thus, the present invention provides a method and apparatus for reducing tape media edge damage in data regions. The mechanism of the present invention controls where popped strands may occur on a tape by shifting the nominal turn around/stream points for a tape media, such that the turn around/stream points are now located in unused regions of the tape. Thus, although the present invention assumes that popped strands may occur and that tape damage may result, the present invention controls where the popped strands occur, such that any resulting tape damage only occurs in unused regions of tape. As a result, data integrity may be preserved.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a storage system to reduce tape edge damage caused by popped strands in data regions, comprising:
    writing data to a tape through a tape head;
    in response to a tape head reaching a predetermined point on the tape, ceasing to write data to the tape;
    continuing tape movement after ceasing to write data to the tape;
    stopping tape movement when the tape head reaches an unused region of tape.

2. The method of claim 1, wherein the predetermined point is a wrap turn around point.

3. The method of claim 1, further comprising:
    shifting the tape head transversely to acquire a new track; move
    starting tape movement in a reverse direction on the new track, wherein the tape movement is started in an unused region of tape; and
    in response to reaching a data region of tape, writing data to the new track.

4. The method of claim 1, wherein the writing, ceasing, continuing, and stopping steps are performed for each track of the tape.

5. The method of claim 1, wherein tape movement is continued for a fixed distance past the predetermined point.

6. The method of claim 5, wherein the fixed distance is 1 to 2 meters past the predetermined point.

7. The method of claim 1, wherein tape start and stop operations are performed in the unused regions of the tape.

8. The method of claim 1, wherein the writing, ceasing, continuing, and stopping steps are used to prevent popped strands from occurring in a format region of the tape.

9. A storage system for reducing tape edge damage caused by popped strands in tape format regions, comprising:
    writing means for writing data to a tape through a tape head;
    ceasing means for ceasing to write data to the tape in response to a tape head reaching a wrap point on the tape;
    continuing means for continuing tape movement after ceasing to write data to the tape;
    stopping means for stopping tape movement when the tape head accesses an unused region of tape.

10. The storage system of claim 9, wherein the predetermined point is a wrap turn around point.

11. The storage system of claim 9, further comprising:
    shifting means for shifting the tape head transversely to acquire a new track;
    starting means for starting tape movement in a reverse direction on the new track, wherein the tape movement is started in an unused region of tape; and
    second writing means for writing data to the new track in response to reaching a data region of the tape.

12. The storage system of claim 9, wherein the writing, ceasing, continuing, and stopping steps are performed for each track of the tape.

13. The storage system of claim 9, wherein tape movement is continued for a fixed distance past the predetermined point.

14. The storage system of claim 13, wherein the fixed distance is 1 to 2 meters past the predetermined point.

15. The storage system of claim 9, wherein tape start and stop operations are performed in the unused regions of the tape.

16. The storage system of claim 9, wherein the writing, ceasing, continuing, and stopping steps are used to prevent popped strands from occurring in a format region of the tape.

* * * * *